United States Patent [19]

Schrodi et al.

[11] Patent Number: 5,173,897
[45] Date of Patent: Dec. 22, 1992

[54] METHOD OF RESTORING THE CORRECT CELL SEQUENCE, PARTICULARLY IN AN ATM EXCHANGE, AND OUTPUT UNIT THEREFOR

[75] Inventors: Karl Schrodi, Heimsheim; Gert Eilenberger, Kirchheim; Stefan Wahl, Hemmingen; Bodo Pfeiffer, Schwieberdingen; Bozo Cesar, Stuttgart, all of Fed. Rep. of Germany

[73] Assignee: Alcatel N.V., Amsterdam, Netherlands

[21] Appl. No.: 630,268

[22] Filed: Dec. 19, 1990

[30] Foreign Application Priority Data

Dec. 23, 1989 [DE] Fed. Rep. of Germany ....... 3942977

[51] Int. Cl.$^5$ ............................................ H04Q 11/04
[52] U.S. Cl. ...................................... 370/60; 370/94.1
[58] Field of Search ................... 370/60, 94.1, 91, 61, 370/85.6

[56] References Cited

U.S. PATENT DOCUMENTS

| | | | |
|---|---|---|---|
| 4,317,196 | 2/1982 | Ulug | 370/60 |
| 4,761,781 | 8/1988 | Calvignac et al. | 370/94.1 |
| 4,894,823 | 1/1990 | Adelmann et al. | 370/60 |
| 4,899,335 | 2/1990 | Johnson, Jr. | 370/60 |
| 4,937,817 | 6/1990 | Lin | 370/60 |
| 4,947,388 | 8/1990 | Kuwahara et al. | 370/94.1 |
| 4,956,839 | 9/1990 | Torii | 370/94.1 |
| 4,995,032 | 2/1991 | Demichelis | 370/60 |
| 5,022,025 | 6/1991 | Urushidani | 370/60 |

FOREIGN PATENT DOCUMENTS

| | | |
|---|---|---|
| 0215526 | 3/1987 | European Pat. Off. . |
| 0336401 | 3/1987 | European Pat. Off. . |
| 1192298 | 8/1989 | European Pat. Off. . |
| 0333226 | 9/1989 | European Pat. Off. . |
| 55-140347 | 11/1980 | Japan . |

Primary Examiner—Douglas W. Olms
Assistant Examiner—T. Samuel
Attorney, Agent, or Firm—Brunell & May

[57] ABSTRACT

To be able to load an ATM switching network as efficiently as possible, the successive cells of one and the same connection are routed to the output by as many different paths as possible; however, mutual overtaking of successive cells must be avoided or corrected. Each cell is held at the output until it is certain that no older cell can be buffered in the switching network. Before the cell is passed on, a check is made to determine whether the cells received from the switching network later include an older cell which must be passed on before that cell. At the input end, consecutive numbers ("Sequence Numbers") are allocated to the cells. A buffer (1) at the output end is operated, at least in part (1 ... d), in the manner of a shift register, thereby introducing a predetermined delay. Prior to the output of a cell, at least the shift-register-like portion of the buffer is examined as to whether a cell written in later is to be put out earlier: if so, the two cells are interchanged.

12 Claims, 2 Drawing Sheets

METHOD OF RESTORING THE CORRECT CELL SEQUENCE, PARTICULARLY IN AN ATM EXCHANGE, AND OUTPUT UNIT THEREFOR

TECHNICAL FIELD

The present invention relates to packet switching systems for telecommunications networks and more particularly to a method of restoring the correct sequence of cells and to an output unit for use therein.

This application is based on and claims priority from an application first filed in Federal Republic of Germany on 23 Dec 1989 under Ser. No. 39 42 977.6. To the extent such prior application may contain any additional information that might be of any assistance in the use and understanding of the invention claimed herein, it is hereby incorporated by reference.

BACKGROUND ART

For future telecommunications, the so-called asynchronous transfer mode (ATM) is currently being investigated and developed. This is a fast packet switching technique; the individual packets are referred to as "cells". In principle, the present invention is also applicable to conventional (slow) packet switching techniques.

In conventional time-division multiplexing, now also referred to as "synchronous transfer mode", each message to be transmitted is divided into fractions of equal length (mostly 8 bits) and sent on, together with fractions of other messages, in a data stream in predetermined equidistant time slots. Consequently, all fractions belonging to the same message are on the way for the same time, arrive at the receiver in the same order and with the same spacing, and are identifiable as belonging together by their temporal position in the data stream. This technique is suitable mainly for transmitting analog signals in pulse-code-modulated form.

Packet switching has been used for data transmission for a long time. In packet switching, the data are fitted into empty places of a data stream as they accrue. As the data are not identifiable by their temporal position in the data stream, they are combined with a header to form a packet. The packet header contains all information required to bring the message part to the correct receiver and to correctly assign it to the other message parts arriving there. In principle, each packet could then follow its own path through the telecommunication network. Very early, however, the virtual circuit approach was adapted, in which all packets belonging to the same message follow a path through the entire network which is defined by the first packet. With this solution, the packet headers, which represent an additional load on the network, can be kept shorter, because each of them must only contain the information for one link and can be provided with the information for the next link with the aid of connection tables while being on its way. In addition, this solution prevents packets belonging together from overtaking each other in a simple manner. Thus, the data are certain to arrive at the receiver in the same order in which they were sent out at the transmitter.

There are various reasons to depart from this rigid linkage of the cells of a message to a selected path, at least in the switching network of an exchange. An essential feature of the ATM technique is that random variations in the traffic volume of individual connections are permitted. Where many independent connections are combined, a certain compensation for these variations occurs. A further compensation and, thus, quite a uniform network load results if the individual cells of a connection do not follow the same path but are distributed to all possible paths, particularly within the switching network of an exchange. This eliminates the need for traffic measurements within the switching network and for the devices necessary for such measurements.

Such connections, as opposed to virtual connections, are referred to as "connectionless". It is necessary, however, to restore the original sequence of the cells on reception of the message in the receiver at the latest, because overtaking cannot be ruled out. If a connection is routed as a "connectionless" connection only within an exchange and as a virtual connection outside the exchange, the restoration of the sequence, commonly referred to as "resequencing", will advantageously be effected at the output of this exchange.

PCT Patent Application EP 89/00941, which was not published prior to the priority date of the present application, (and which corresponds to commonly assigned U.S. application Ser. No. 07/566,038 filed Aug. 9, 1990) proposes as a solution to additionally delay each cell by a fixed time with respect to its entry into the exchange in a manner known per se for virtual connections, and to subsequently output this cell. Thus the correct sequence is automatically restored.

As a rule, however, the requirement to keep the delay constant, i.e., to compensate for "delay jitter", is not imposed. To meet this requirement, "time stamps" have to be added to the cells, which, in turn, requires a central clock and a network for exactly distributing the time.

DISCLOSURE OF INVENTION

It is the object of the invention to restore cells of the same connection which may have overtaken one another to their original sequence prior to retransmission without the need for complicated synchronization.

The fundamental idea is to hold each cell at the output, i.e., where all paths converge, until it is certain that no older cell can be buffered in the switching network. Before the cell is sent on, a check is made to determine whether the cells that arrived at the output later include one that has to be put out before that cell.

This is preferably implemented by allocating consecutive numbers to the cells at the input end (on a per-connection basis or not) and providing a buffer at the output end which is operated, at least in part, in the manner of a shift register, thereby introducing a predetermined delay. Prior to the output of a cell, at least the shift-register-like portion of the buffer is examined as to whether a cell written in latter has to be put out earlier; if so, the two cells will be interchanged.

BRIEF DESCRIPTION OF DRAWINGS

The invention will become more apparent from the following description of an embodiment of the invention taken in conjunction with the accompanying drawings, in which.

BEST MODE FOR CARRYING OUT THE INVENTION

Figure 1:
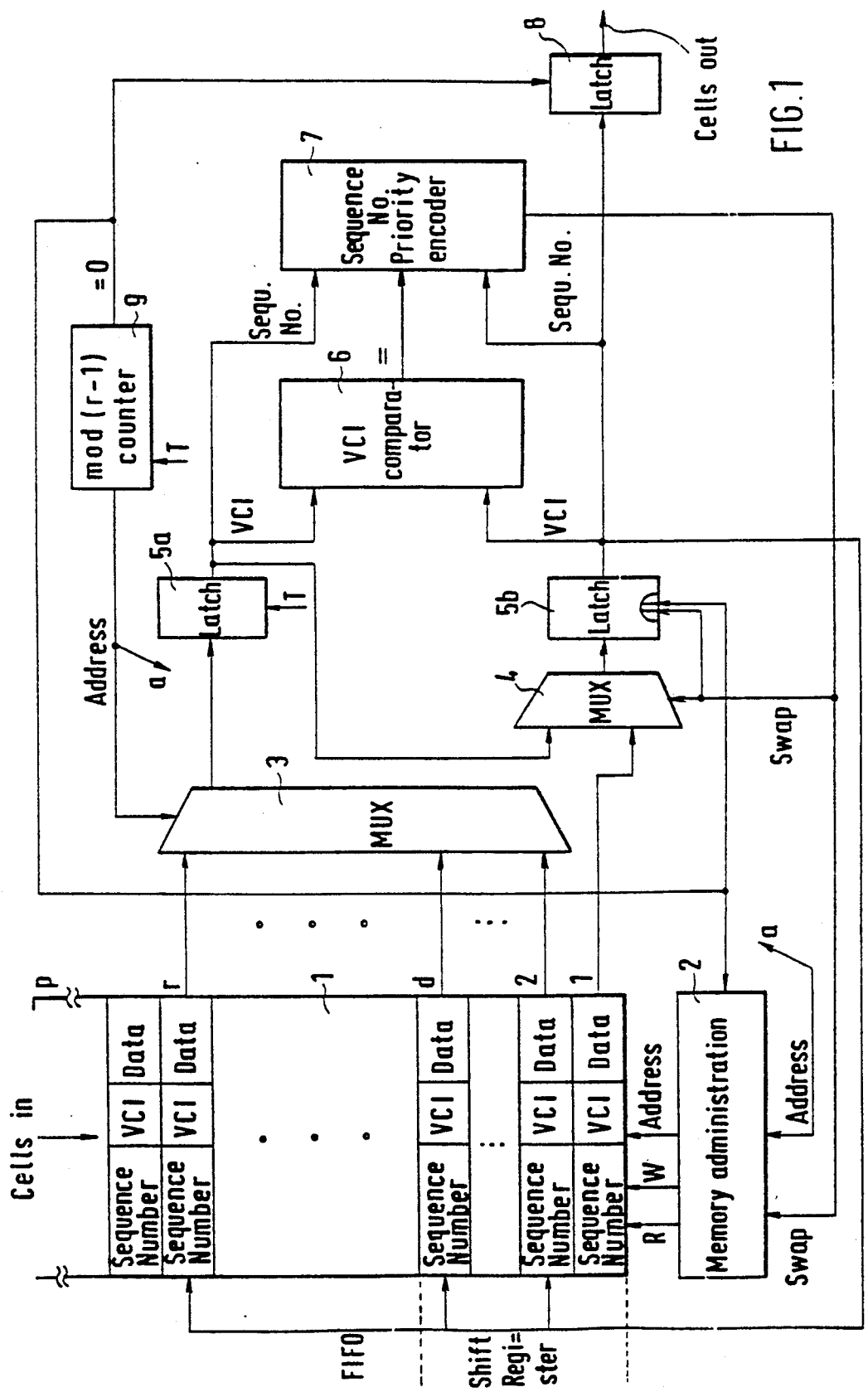
FIG. 1 is a block diagram of an output unit in accordance with the invention.

In the embodiment of an output unit shown in FIG. 1, a data stream is assumed in which all bits of a cell are transferred simultaneously over parallel lines. As a rule, that is neither the case nor particularly advantageous. On the one hand, however, it is alway possible to produce such a data stream by means of serial-to-parallel converters, parallel-to-serial converters, and buffers, and on the other hand, those skilled in the art will be readily able to adapt the present embodiment to a specified data format as is used, for example, in an ATM exchange. In that case, it will be advantageous or even necessary to store in the buffer not the cells themselves, but only the information required to rearrange and retrieve the cells stored in a separate memory. Indirect addressing is familiar to those skilled in the art. It can be readily used in the example shown; then, instead of the data, the addresses of the data are stored.

The output unit shown in FIG. 1 includes a buffer 1, a memory administration unit 2, two multiplexers 3 and 4, two latches 5a and 5b, two comparators 6 and 7, an additional latch 8, and a counter 9.

The buffer 1 has p locations. Each location is capable of containing one complete cell. According to an important aspect of the invention each cell consists of a label of a first kind, designated "Sequence Number", a label of a second kind, designated VCI (=Virtual Circuit Identifier), and the remainder of the cell, designated "Data". The representation of FIG. 1 does not illustrate the actual memory requirements of the individual parts correctly.

The label of a first kind, "Sequence Number", must be allocated at a point of the system where all cells belonging to the same connection are still present in the original order. For different applications, a sequence number is added to each cell already at the transmitting terminal. Provided that this sequence number can be accessed at any time, it can e evaluated by the present invention. As a rule, however, it is advantageous to insert the labels of a first kind at the input of the system which includes the output unit described herein. The preferred application is in an ATM switching system, so that the labels of a first kind are preferably added at the input of the switching system.

The labels of a first kind need not necessarily be consecutive within each connection. It suffices to consecutively count the cells of all connections routed via the same input. To allocate these labels, use is preferably made of a modulo-N counter, with N having to be chosen so large that within a predetermined time, less than N/2 numbers are allocated as labels of a first kind. Because of the periodic occurrence of all numbers, there must be a sufficient distance in both directions to obtain unambiguity. With the specified choice of N, all those cells can be unambiguously reconstructed in their original sequence which are not farther than said predetermined time apart when the numbers are being allocated. This time must then be predetermined so that, except for the permitted error rate, it is ensured that within this time each cell passes through the last r locations of the buffer 1. An approximate guide value for the time to be predetermined is twice the difference between the maximum delay and the minimum delay between the allocation of the labels of a first kind and the arrival in the output unit.

The label of a second kind, VCI, marks the association of a cell with a particular virtual connection. Such a label is usually contained in the header of a cell anyhow; for the purposes of the present invention, it only needs to be made accessible for evaluation. This label can be dispensed with, at least in regard to the present invention, if the labels of a first kind are allocated synchronously or at least plesiochronously at all inputs of the system. A plesiochronous allocation of labels of a first kind would also require a uniform system time, but because of the permissible deviations, the required amount of circuitry would be smaller than with synchronous allocation.

Instead of the remainder of the cell, labelled "Data", the address where this remainder is stored in another memory may be stored in the buffer 1.

The buffer 1 is divided into three portions, namely a shift-register-like portion, labelled "Shift Register", with locations 1 through d, and a portion operated in the manner of a FIFO memory, labelled "FIFO", which, in turn, is composed of two portions with locations d+1 through r and r+1 through p, respectively. At least locations 1 through r must be individually accessible such that their contents can be read or that new contents can be written into them.

The buffer size, i.e., the choice of the numerical values for d, r and p, depends on the specific application. The main considerations are the permissible error rate, the minimum and maximum delays of a cell from the first branching point, the number of simultaneous connections permitted via one output unit, the minimum and maximum numbers of cells permitted for a connection per unit of time, and the permissible variation of the number of cells per unit of time. Approximate guide values are $d=128$, $r=256$, and $p=512$. The choice of the range of values for the labels of a first kind, "Sequence Number", is dependent on those values. For these numerical values and the connection-specific determination of these labels, a guide value is $N=512$. The choice of these numerical values is somewhat uncritical inasmuch as, because of the practical implementation, powers of two are preferred and, except for the choice of d, only lower limit values have to be taken into account. The lower limit for the choice of d follows from the fact that the shift register must provide a minimum delay equal to the difference between the minimum and maximum delays defined above. Since delays should be avoided, however, this value should not be substantially exceeded.

Cells arriving at the input of the output unit, which are labelled "Cells in", are first examined as to whether they are cells to be output at the output or cells ending in the output unit. These are, on the one hand, empty cells and, on the other hand, cells containing the control signals for the output unit (or an input unit commonly connected to the latter which is not otherwise reachable). The cells to be output are entered into the buffer 1, such that they first "fall through" to the lowest free location in the portion operated in the manner of a FIFO memory. Whenever a cell is output at the output, all cells in the buffer move down by one location. If the last location of the FIFO memory, d+1, is occupied, the cell contained therein will be transferred into the first location of the shift register, d. If location d+1 is empty, an empty cell must be written into location d. The residence time of each cell, at least relative to any other cell, can thus be derived from its position in the buffer 1. The output from the buffer 1 will be described below.

The memory administration unit 2 is shown in FIG. 1 highly schematically. It has a dual function. First, it manages the above-described normal operation of the buffer 1. This is done by applying addresses, labelled "Address", write instructions, W, and read instructions, R. Also required (not shown in FIG. 1) is information as to the presence or absence of a cell to be written in. The second function of the memory administration unit 2 is to exchange the contents of the location addressed by the counter 9, "Address", for the contents of the latch 5b if an instruction, "Swap", is given to do so.

Through the multiplexer 3, the contents of any one of locations 2 through r of the buffer 1 can be accessed on a selective basis and transferred into the latch 5a. The memory location is selected by the counter 9, "Address".

At the beginning of an output cycle, the contents of location 1 of the buffer 1 are transferred to the latch 5b through the multiplexer 4. That will be the case when the counter 9 is reset, "=0". A special instruction, Swap, applied to the multiplexer 4 causes the contents of the latch 5a to be transferred to the latch 5b. The fact that by means of the same instruction, Swap, data is written into and read from the latch 5b is nothing unusual and can be taken into account by taking measures familiar to those skilled in the art.

The comparator 6 compares the labels of a second kind, VCI, of those two cells which are currently stored in the latches 5a and 5b. Only if the two labels of a second kind are equal, i.e., if the two cells belong to the same connection, will the subsequent comparator be activated.

The comparator 7 compares the labels of a first kind, "Sequence Number", of the two cells contained in the latches 5a and 5b. If the comparator 6 indicates that the two cells belong to the same connection, and the comparator 7 indicates that the cell contained in the latch 5a is older than that contained in the latch 5b, an instruction, Swap, will be provided which causes the older cell to be transferred to the latch 5b and the younger cell to take the place of the older cell in the buffer 1. The two cells are thus interchanged.

The counter 9 provides the correct timing. It counts periodically from 2 to r at a predetermined clock rate T. If the counter 9 is reset, "=0", at the count r, one output cycle will be terminated and the next output cycle will be started. The contents of the latch 5b, found in the previous cycle to be the oldest cell belonging to a particular connection, are transferred to the latch 8 and are available at the output of the latter, "Cells out". At the same time, the contents of location 1 of the buffer 1 are transferred through the multiplexer 4 to the latch 5b. After that, locations 2 through r are successively searched for older cells (labels of a first kind) of the same connection (labels of a second kind). To this end, the contents of each of these locations are transferred through the multiplexer 3 to the latch 5a and compared by means of the comparators 6 and 7. The above-described exchange actions, Swap, ensure that at the count r of the counter 9, the oldest cell of the connection being considered is actually stored in the latch 5b, and that all younger cells of this connection are still or again contained in the buffer 1.

As already indicated, the label of a second kind, "VCI", and, thus, the comparator 6 can be dispensed with if all labels of a first kind, "Sequence Number", are allocated synchronously or at least plesiochronously. Although cells belonging to different connection are then interchanged, the correct sequence of the cells within the connection is maintained. Even though it is an object of the present invention to be able to avoid exact synchronism and, thus, the use of time stamps, the present invention provides a further, alternative solution for this case.

Figure 2:
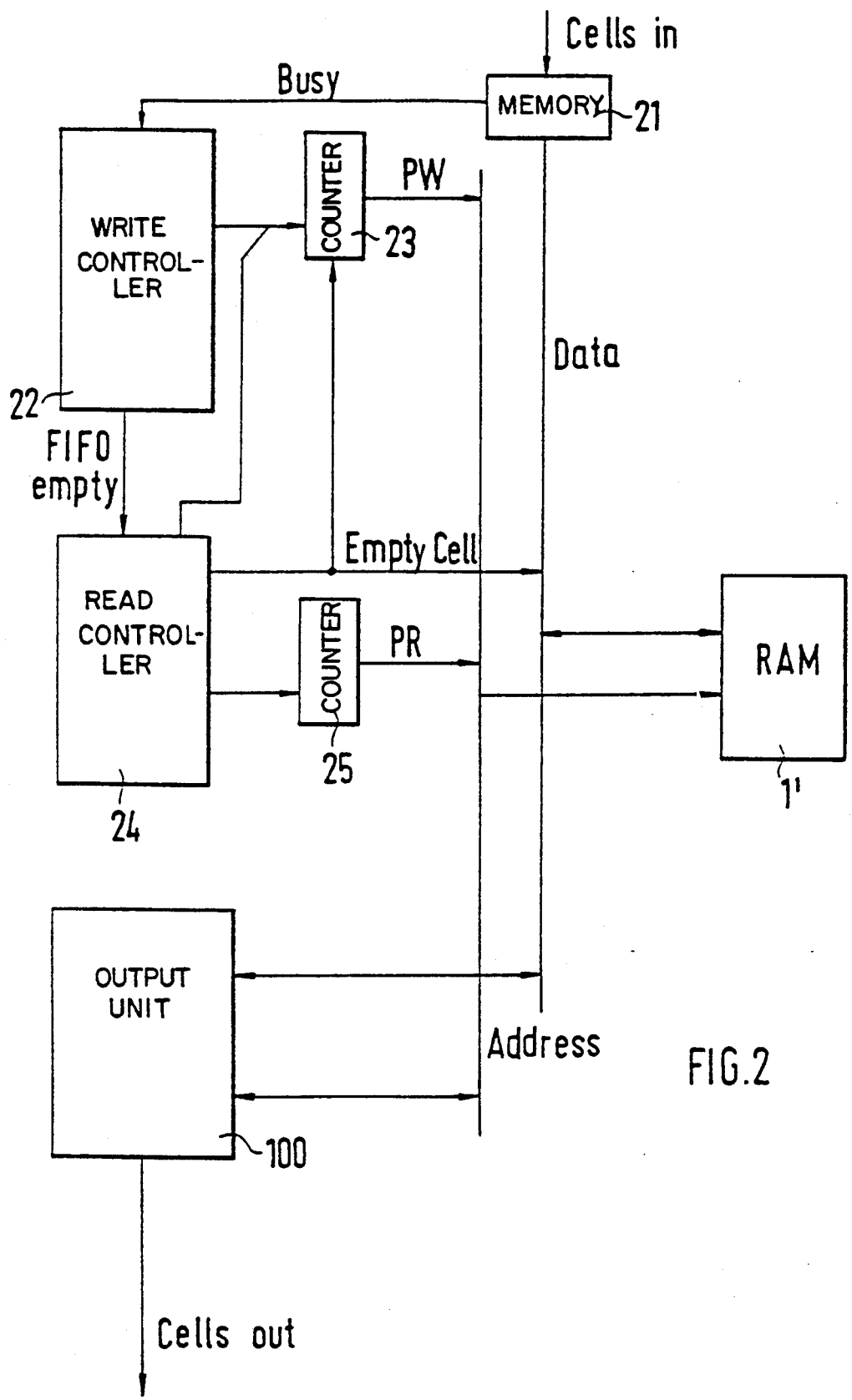
FIG. 2 is a block diagram of the buffer included in the output unit of FIG. 1.

The representation of the output unit in FIG. 1 illustrates mainly the operation of the output unit. The construction and administration of the buffer, which consists of a portion operated in the manner of a FIFO memory and a portion operated in the manner of a shift register, are apparent from FIG. 2. The clock distribution, including the distribution of the write and read instructions, is not shown in FIG. 2.

The buffer is implemented with a random-access memory (RAM), 1'. The incoming cells are applied through an input memory 21 to a data bus, "Data", to which the random-access memory 1' is connected. A write controller 22 is activated, "Busy", by the input memory 21 when a cell to be written in is applied. Via the write counter 23, an address PW is applied over an address bus, "Address", to the random-access memory 1', and the cell is written into the latter. The write counter 23 is then incremented from the write controller 22. A read controller 24 specifies via a read counter 25 the address, PR, which corresponds to location 1. After each cell output, the read counter 25 is incremented from the read controller 24. The difference between the contents PW of the write counter 23 and the contents PR of the read counter 25 must always be at least equal to d. This is monitored by the write controller 23; if this condition is not fulfilled, "FIFO empty", this will be signalled to the read controller 24, which will apply an empty cell, "Empty Cell", to the data bus, "Data", and cause this empty cell to be written into the location specified by the write counter 23. The read controller 24 will then increment the write counter 23.

The remainder of the output unit is indicated by an access, comparator, and output unit 100.

In conclusion, examples of possible further modifications will be given.

During the search for the oldest cell of a connection, it is not absolutely necessary that a relatively older cell be exchanged for the cell to be put out several times. It suffices to search the entire memory area, to retain only the position and age of the oldest cell found, and to exchange only once at the end of the search process.

It is also possible not to exchange at all and to only move the oldest cell found to the front during output.

The shift-register-like portion of the buffer need not necessarily form the end of the buffer. It may also be located at the beginning or in the middle of the buffer.

We claim:

1. Method of restoring the correct sequence of data packets or cells in a packet switching system, wherein, during transmission from an input unit to an output unit, related cells belonging to a single data stream from a specified input unit to a specified output unit of the switching system may overtake each other, said method comprising the steps of:

prior to transmission form the input unit, adding a respective sequence label to each of the cells to identify the original transmission order of the cells;

upon reception at the output unit, buffering each cell in an output buffer;

waiting for at least a predetermined minimum delay time to elapse following the reception of a candidate cell still contained in the buffer;

comparing the sequence label of said candidate cell with the corresponding sequence labels of other cells in said output buffer;

outputting said candidate cell if the comparison indicated that the candidate cell was originally transmitted before the other cells in the output buffer; and instead of the candidate cell, outputting another cell if the comparison indicated that the other cell was originally transmitted before the candidate cell.

2. A method as claimed in claim 1, wherein prior to the output of said other cell, said candidate cell takes the place of the other cell in said output buffer.

3. A method as claimed in claim 1, wherein numbers formed by counting modulo N are used as the sequence labels, and N is sufficiently large that less than N/2 numbers can be allocated as sequence labels within said predetermined delay time.

4. A method as claimed in claim 3, wherein for each said connection, the sequence labels are allocated separately to the cells of said each connection.

5. A method as claimed in claim 3, wherein for all connections routed via one said input unit, the sequence labels are allocated jointly to the cells of said all connections.

6. A method as claimed in claim 1, wherein a connection label is added to each cell to identify the connection to which the cell belongs, and said other cell is output instead of the candidate cell if and only if the respective connection labels are the same for both said other cell and said candidate cell.

7. A method as claimed in claim 1, wherein said predetermined minimum delay is realized by operating at least a portion of the buffer as a shift register, thus introducing the predetermined minimum delay.

8. A method as claimed in claim 1, wherein the predetermined minimum delay is such that if a second cell is transmitted from said input unit more than said predetermined minimum delay after a first cell, the probability that the second cell will be received before the first cell at said output unit is less than a predetermined permissible error probability.

9. Output unit for restoring the correct sequence of cells at the output of a packet switching system by means of respective sequence labels associated with each of said cells, said output unit comprising:

a buffer for buffering cells to be put out;

an access means for obtaining access to any cell contained in the buffer;

timing means, associated with the access means, for determining the residence time of at least one cell in the buffer; and comparing means for comparing, following a predetermined minimum said residence time of said at least one cell, the respective sequence labels of said at least one cell and any other cell accessed by the access device to thereby determine the order the two cells entered said system.

10. An output unit as claimed in claim 9, further comprising interchange is provided by means for selectively replacing one of the two compared cells with the other of said two cells.

11. The method of claim 1, wherein said packet switching system in an asynchronous transfer mode switching system.

12. The output unit of claim 9, wherein said packet switching system in an asynchronous transfer mode switching system.

* * * * *

UNITED STATES PATENT AND TRADEMARK OFFICE
CERTIFICATE OF CORRECTION

PATENT NO.  : 5,173,897
DATED       : December 22, 1992
INVENTOR(S) : K. SCHRODI ET AL It is certified that error appears in the above-identified patent and that said Letters Patent is hereby corrected as shown below:

Col 2    Line 48    Change "put out" to —output—

Col 3    Line 8     Change "alway" to —always—

Col 3    Line 40    Change "can e" to —can be—

Col 6    Line 64    Change "form" to —from—

Signed and Sealed this

Ninth Day of November, 1993

Attest:

BRUCE LEHMAN

Attesting Officer           Commissioner of Patents and Trademarks